(12) United States Patent
Bayya et al.

(10) Patent No.: US 7,873,251 B2
(45) Date of Patent: Jan. 18, 2011

(54) PHOTONIC BAND GAP GERMANATE GLASS FIBERS

(76) Inventors: Shyam S. Bayya, 43747 Webster Ct., Ashburn, VA (US) 20148; Jasbinder S. Sanghera, 23171 Kleinsmith Way, Ashburn, VA (US) 20148; Leslie Brandon Shaw, 4488 Occoquan View Ct., Woodbridge, VA (US) 22192; Ishwar D. Aggarwal, 9808 Thorn Bush Dr., Fairfax Station, VA (US) 22039

( * ) Notice: Subject to any disclaimer, the term of this patent is extended or adjusted under 35 U.S.C. 154(b) by 0 days.

(21) Appl. No.: 12/765,910

(22) Filed: Apr. 23, 2010

(65) Prior Publication Data

US 2010/0202743 A1 Aug. 12, 2010

Related U.S. Application Data

(60) Continuation-in-part of application No. 11/623,359, filed on Jan. 16, 2007, now Pat. No. 7,295,740, which is a division of application No. 10/904,062, filed on Oct. 21, 2004, now abandoned, which is a continuation-in-part of application No. 10/632,210, filed on Aug. 1, 2003, now Pat. No. 6,993,230.

(51) Int. Cl.
*G02B 6/02* (2006.01)
*C03B 37/022* (2006.01)

(52) U.S. Cl. .................. 385/125; 385/123; 385/122; 385/141; 65/385; 65/398; 65/393

(58) Field of Classification Search ............ 385/123, 385/122, 124, 125, 126, 127, 128, 141; 65/385, 65/398, 21.4, 25.1, 395, 393, 17.2, 494, 435
See application file for complete search history.

(56) References Cited

U.S. PATENT DOCUMENTS

| | | | | |
|---|---|---|---|---|
| 5,802,236 | A * | 9/1998 | DiGiovanni et al. | 385/127 |
| 6,444,133 | B1 * | 9/2002 | Fajardo et al. | 216/24 |
| 6,539,155 | B1 * | 3/2003 | Broeng et al. | 385/125 |
| 6,631,234 | B1 * | 10/2003 | Russell et al. | 385/125 |
| 6,705,126 | B2 * | 3/2004 | Paek et al. | 65/395 |
| 6,847,771 | B2 * | 1/2005 | Fajardo et al. | 385/125 |
| 6,993,230 | B2 * | 1/2006 | Sanghera et al. | 385/125 |
| 7,295,740 | B2 * | 11/2007 | Sanghera et al. | 385/125 |
| 2002/0150367 | A1 * | 10/2002 | Gallagher | 385/125 |
| 2003/0161599 | A1 * | 8/2003 | Broderick et al. | 385/125 |
| 2003/0230118 | A1 * | 12/2003 | Dawes et al. | 65/379 |
| 2003/0231846 | A1 * | 12/2003 | Fajardo et al. | 385/125 |
| 2004/0050110 | A1 * | 3/2004 | Berkey et al. | 65/393 |
| 2004/0071423 | A1 * | 4/2004 | Libori et al. | 385/127 |
| 2004/0105641 | A1 * | 6/2004 | Russell et al. | 385/125 |
| 2004/0151454 | A1 * | 8/2004 | Fajardo et al. | 385/126 |
| 2004/0228592 | A1 * | 11/2004 | Gaeta et al. | 385/125 |

(Continued)

*Primary Examiner*—Brian M Healy
(74) *Attorney, Agent, or Firm*—Amy Ressing; Suresh Koshy

(57) ABSTRACT

A photonic band gap fiber and method of making thereof is provided. The fiber is made of a germanate glass comprising at least 30 mol % of a germanium oxide and has a longitudinal central opening, a microstructured region having a plurality of longitudinal surrounding openings, and a jacket. The air fill fraction of the microstructured region is at least about 90%. The fiber may be made by drawing a preform into a fiber, while applying gas pressure to the microstructured region. The air fill fraction of the microstructured region is changed during the drawing.

18 Claims, 7 Drawing Sheets

U.S. PATENT DOCUMENTS

2005/0025965 A1* 2/2005 Sanghera et al. ............ 428/364
2005/0074215 A1* 4/2005 Sanghera et al. ............ 385/125
2010/0202743 A1* 8/2010 Bayya et al. ................ 385/125

* cited by examiner

PHOTONIC BAND GAP GERMANATE GLASS FIBERS

CROSS-REFERENCE TO RELATED APPLICATIONS

This application is a continuation-in-part application of U.S. patent application Ser. No. 11/623,359 now U.S. Pat. No. 7,295,740, filed on Jan. 16, 2007, which is incorporated herein by reference in its entirety, and which is a division of U.S. patent application Ser. No. 10/904,062, now abandoned, filed on Oct. 21, 2004, which is incorporated herein by reference in its entirety, and which is a continuation-in-part of application Ser. No. 10/632,210, filed on Aug. 1, 2003, now U.S. Pat. No. 6,993,230, which is incorporated herein by reference in its entirety.

BACKGROUND OF THE INVENTION

1. Field of the Invention

The invention relates generally to photonic band gap fibers.

2. Description of the Related Art

Hollow core photonic band gap (HC-PBG) fibers have been fabricated from silica glass and reported in the literature (Cregan et al., "Single-mode photonic band gap guidance of light in air," Science, 285(5433), 1537-1539 (1999); Barkou et al., "Silica-air photonic crystal fiber design that permits waveguiding by a true photonic bandgap effect," Optics Letters, 24(1), 46-48 (1999); Venkataraman et al., "Low loss (13 dB/km) air core photonic band-gap fibre," ECOC, Postdeadline Paper PD 1.1, September, 2002. All referenced publications and patents are incorporated herein by reference).

SUMMARY

A glass fiber, comprising, a fiber comprising at least 30 mol % of a germanium oxide, a longitudinal central opening in the fiber, a microstructured region in the fiber comprising a plurality of longitudinal openings disposed around the central opening, a jacket surrounding the microstructured region, wherein the air till fraction of the microstructured region is at least about 90%.

A glass fiber, comprising, a fiber comprising at least 30 mole % of a germanium oxide, a longitudinal central opening in the fiber, a microstructured region in the fiber comprising a plurality of longitudinal openings disposed around the central opening, a jacket surrounding the microstructured region, wherein the air fill fraction of the microstructured region is at least about 90%, and wherein the fiber displays a photonic band gap inhibiting radial transmission of light having a wavelength in the range of approximately 2 μm and approximately 6 μm.

A method of making a fiber comprising the steps of, providing a preform comprising at least 30 mol % of a germanium oxide, wherein the preform comprises a longitudinal central opening and a microstructured region comprising a plurality of longitudinal openings disposed around the central opening, pressurizing surrounding openings with a gas, and drawing the preform into a fiber at an elevated temperature while maintaining the gas pressure to retain the longitudinal central opening and the microstructured region: wherein the air fill fraction of the microstructured region of the fiber is greater than approximately 90%.

BRIEF DESCRIPTION OF THE DRAWINGS

A more complete appreciation of the invention will be readily obtained by reference to the following Detailed Description and the accompanying drawings.

DETAILED DESCRIPTION

Figure 1:
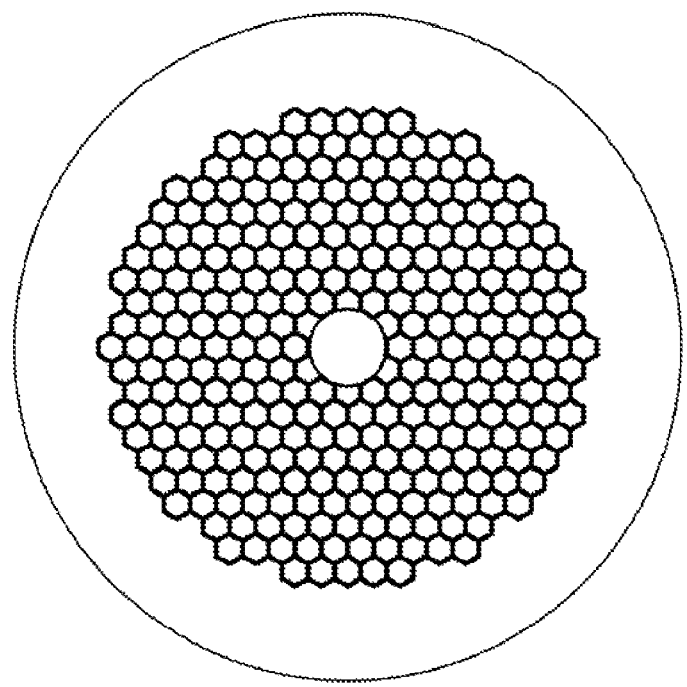
FIG. 1 shows a cross-section of a Hollow Core Photon Band Gap (HC-PBG) fiber.

FIG. 1 shows a somewhat idealized schematic cross-section of a hollow core photonic band gap (HC-PBG) fiber. The periodic layered structure of holes 110 and glass creates a photonic band gap that inhibits light from propagating radially into the structured region (analogous to a 2D grating) and so light is confined to the hollow core 120. This example is known as a triangular hole pattern because three vertices of glass intersect at each point in the structured region. Typically, the periodicity of the holes is on the scale of the wavelength of light and the outer glass 130 is used for providing mechanical integrity to the fiber. The fact that light travels in the hollow core 120 also means that the losses will be lower so longer path lengths can be used. Also, non-linear effects will be negligible and damage thresholds will be higher so that higher power laser energy can be transmitted through the fiber for military and commercial applications such as laser power delivery for medical surgery, remote spectroscopy, chemical, and biological sensing. Also, because light is guided in the hollow core, an analyte disposed therein will have maximum interaction with light, unlike traditional evanescent sensors.

In silica PBG fibers as well as the PBG fibers created using the principles and processes described herein, the finite number of hole layers, variations in hole periodicity and deformation of the air hole size and shape results in penetration of the mode field into the glass. Even though only a small fraction of the light may be travelling in the glass, over distances, this can result in significant loss for signals at wavelengths that are highly absorbed by the PBG glass matrix. In addition to the problem of signal loss, propagation of high power energy at these wavelengths can lead to heating and damage of the fiber. Thus, while silica PBG fiber structures can be designed to propagate light beyond 2 μm, the high absorption of silica in the multi phonon edge will result in significant loss.

In light of these problems using silica glass to guide midinfrared light such as that with wavelengths between approximately 2 μm and 6 μm, it is desirable to find a material with suitable properties, including three selection criteria: low absorption above 2 μm wavelength, a strong photonic band gap region in the desired wavelength range, and physical properties that lend the material to formation of a PBG fiber. Although the absorption of light as a function of wavelength is known for many specialty glasses, there has been little published research on the suitability of fabrication of PBG fibers for specific glasses, nor is there guidance on the location of photonic band gaps for such fibers. To date, there is no predictive tool fir finding glasses meeting all three selection criteria for specific glasses. Moreover, photonic band gaps are the result of complex geometric and optical considerations, and can not be easily determined.

It is presently disclosed that PBG fibers can be constructed from germanate glasses (glass comprising at least 30 mole % of a germanium oxide) with longer multiphonon cutoff edges than silica using certain principles and processes described herein. Such fibers provide the advantage of low loss at wavelengths that are highly absorbed by silica. Germanate glasses transmit farther in the mid IR wavelength range as compared to silica. This broader transmission window of germanate glass enables low loss PBG fibers in the entire visible to mid IR wavelength region (0.4 µm to about 6.0 µm).

Figure 2:
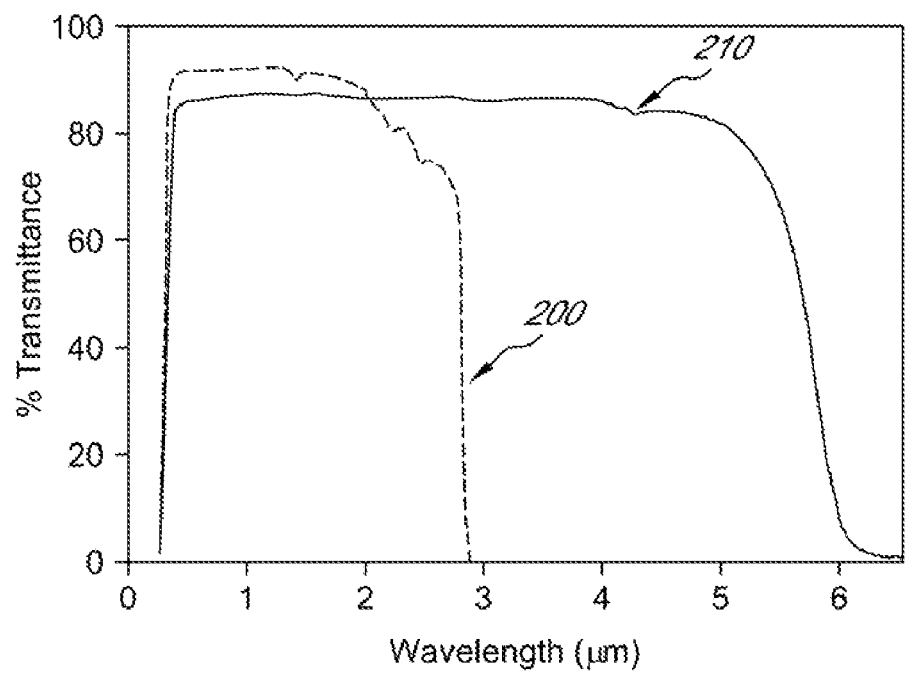
FIG. 2 shows a graph comparing the transmission of Barium GalloGermanate (BGG) glass with that of BK-7 (silicate) glass.
Figure 3A:
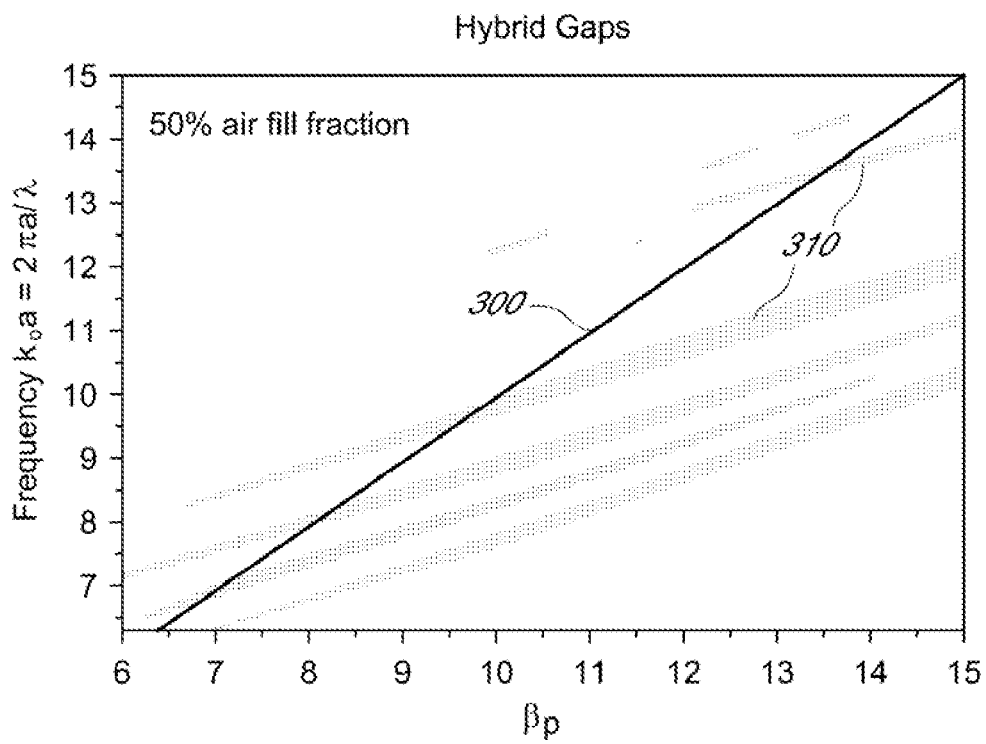
FIG. 3 shows the results of modeling performed on BGG PBG fiber with triangular air hole pattern and air fills of 50 to 95% in 5% increments.
Figure 3B:
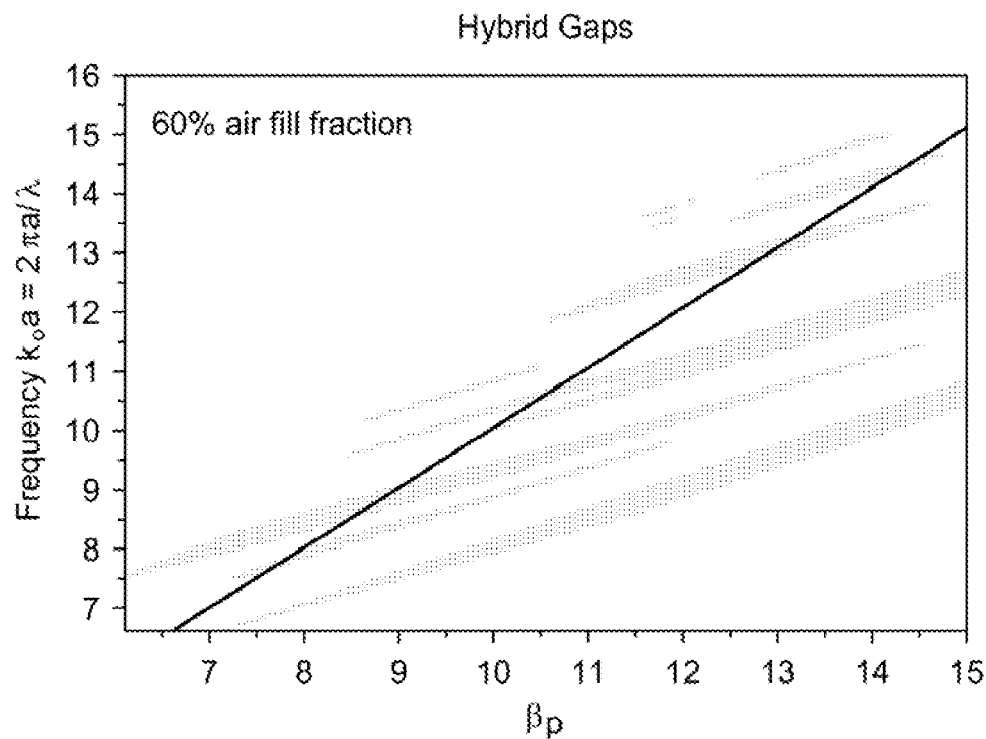
Figure 3C:
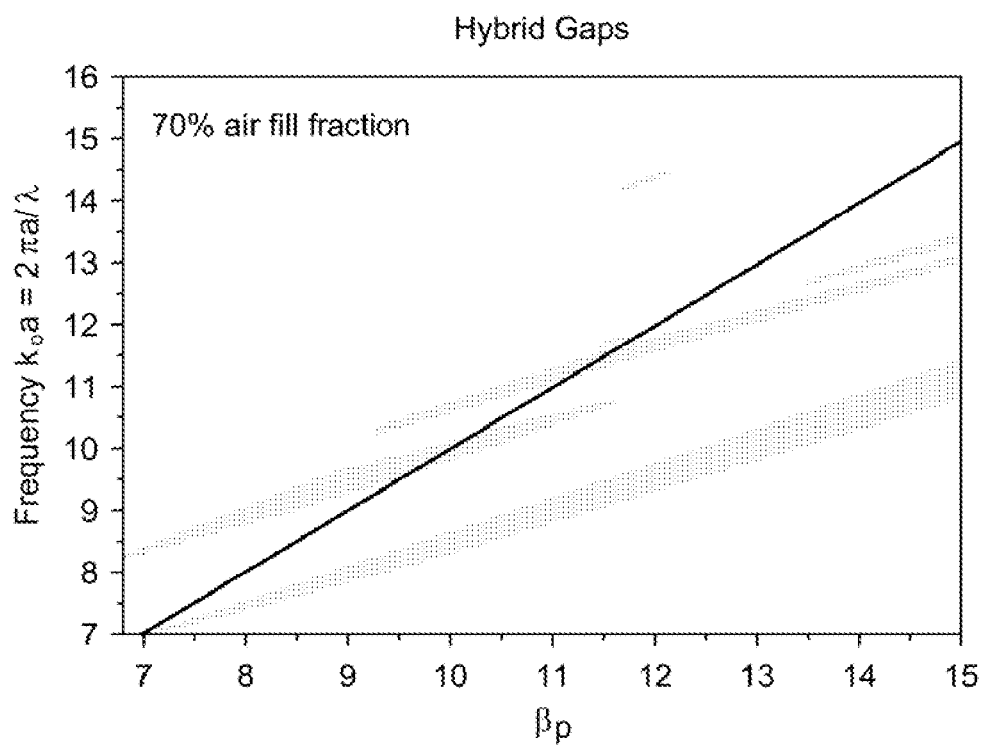
Figure 3D:
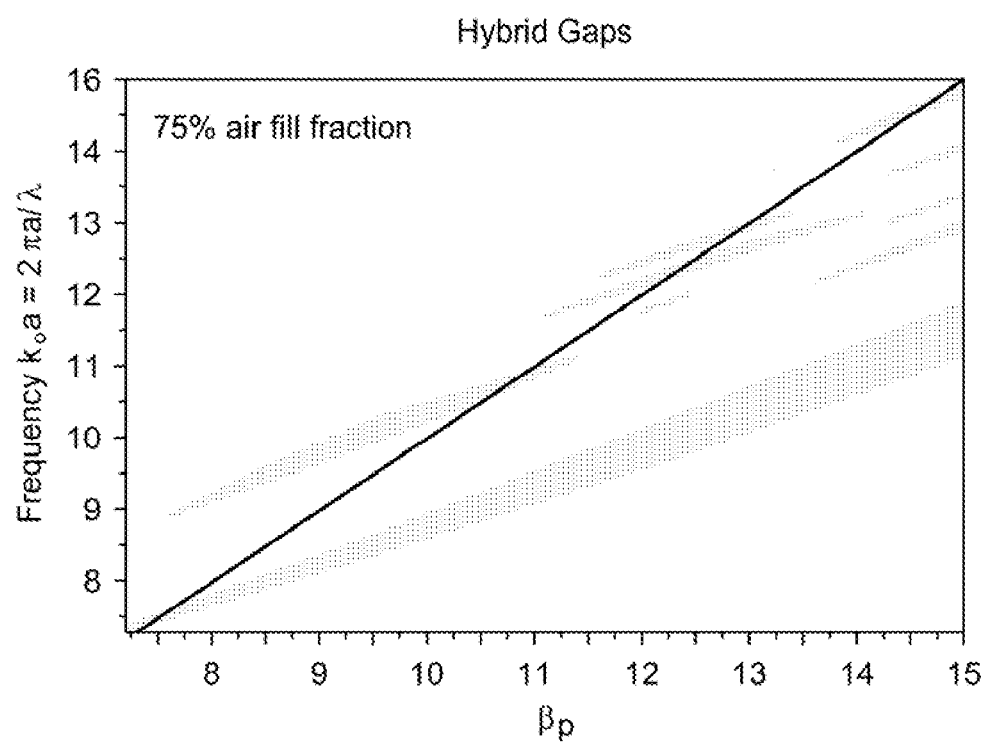
Figure 3E:
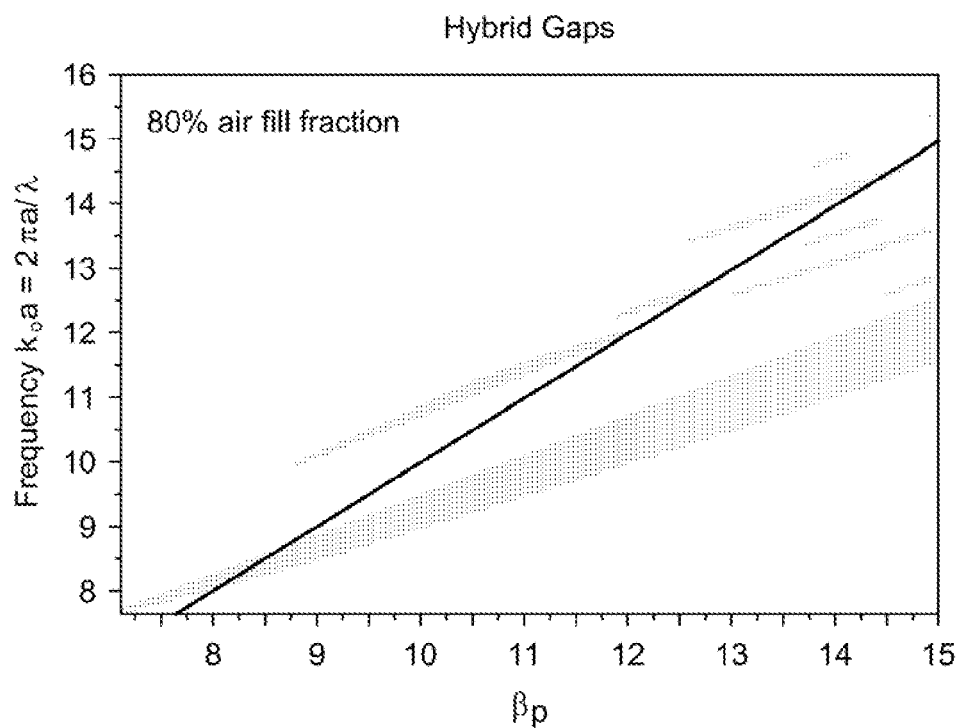
Figure 3F:
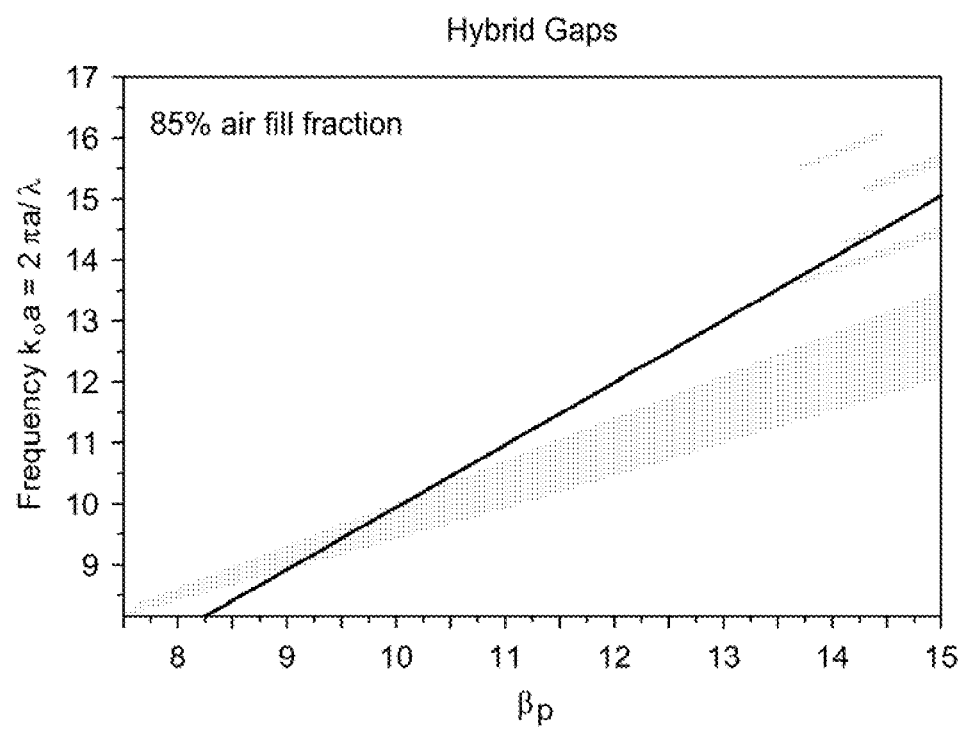
Figure 3G:
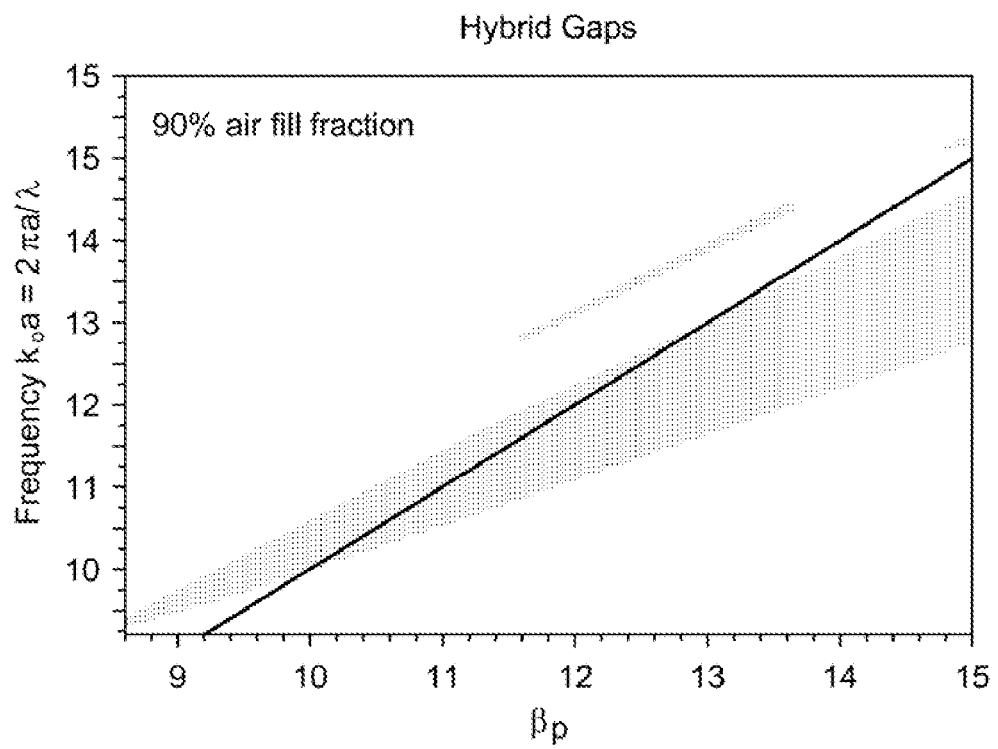
Figure 3H:
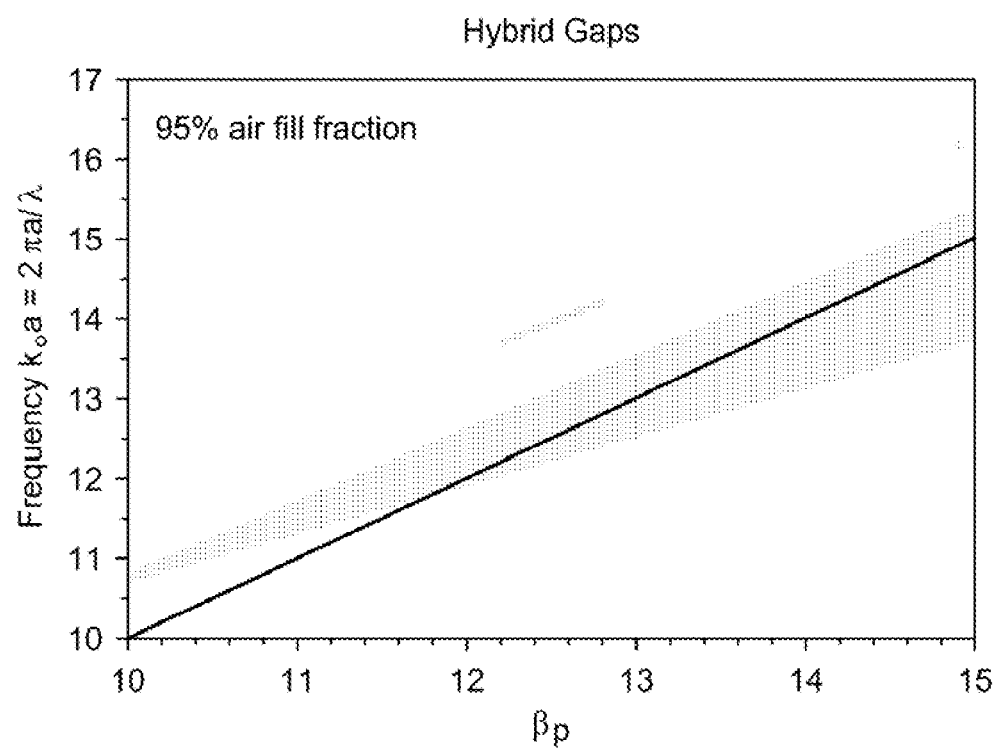

FIG. 2 shows a graph comparing the transmission of a Barium GalloGermanate (BGG) glass (for instance, a high $T_g$ glass, such as $15BaO-15Ga_2O_3-70GeO_2$) with that of BK-7 (silicate) glass. One embodiment includes germanate PBG fiber for transmission in the infrared region beyond 2 µm in addition to visible and near-infrared transmission of approximately 0.4 µm to 2 µm.

In FIG. 2 the broken-line curve 200 corresponds to the transmittance of a BK-7 silicate glass as a function of wavelength. While the silicate glass shows good transmittance for the visible and near-infrared region, it shows poorer transmittance above approximately 3 µm. The solid-line curve 210 corresponding to Barium GalloGermanate glass shows good transmittance throughout the visible and near-infrared regions and into the mid infrared region up to approximately 6 µm.

It is presently disclosed that germanate glasses, which have certain similar physical properties to silicate glasses, can be drawn to PBG structure with 90-95% air fill fraction. Germanate glasses can be classified into two categories based on their glass transition temperature ($T_g$) into low $T_g$ germanate glasses and high $T_g$ germanate glasses. Low $T_g$ germanate glasses typically have their $T_g$ below about 500° C. These glasses are typically melted below 1200° C. using conventional furnaces and can be melted inside a glove box. This allows the glass hatch handling, melting and glass purification to be carried out in dry environment. The preforms for making low $T_g$ germanate PBG fiber can made via extrusion. Although tube stacking method of making the preforms can also be used. Examples of Low $T_g$ germanate glasses include: $56GeO_2-29PbO-15PbF_2$; $80GeO_2-20Sb_2O_3$; $30GeO_2-50PbO-18AlF_3-2PbF_2$; and $25Sb_2O_3-25PbF_2-50GeO_2$.

High $T_g$ germanate glasses (e.g. BGG glasses) typically have their $T_g$ greater than about 500° C. These glasses require high temperature melting (over about 1200° C.). Suitable specialty furnaces are available, and chemical purification techniques for use with the high temperatures are known. For example, some are described in U.S. Pat. No. 7,285,509. Because of the high temperature of melting involved, these glasses may have to be melted outside the glove boxes. The preforms for making PBG fibers from high $T_g$ germanate glasses will preferably use the method of tube stacking. Direct extrusion process will often be more cumbersome due to the high extrusion temperatures and interaction of glass with the molds during the extrusion process. Examples of High $T_g$ germanate glasses include: $10BaO-10Ga_2O_3-80GeO_2$; $15BaO-10Ga_2O_3-75GeO_2$; $15BaO-15Ga_2O_3-70GeO_2$; $43BaO-17Ga_2O_3-40GeO_2$; and $48BaO-22Ga_2O_3-30GeO_2$.

The periodicity of the holes, the air fill fraction and the refractive index of the glass dictate the position of the photonic band gap or gaps, namely the transmission wavelengths guided through the hollow core.

PBG fibers may he obtained by first making a microstructured preform and then drawing this into fiber with the correct overall dimensions. In some cases, the air fraction needed in the fiber, and therefore preform, is as high as 90% or even higher to provide a photonic band gap. Computer software packages such as Rsoft's BandSolve v.1.1.6 can be used to prospectively evaluate target PBG fiber structures. BandSolve, for instance, utilizes a full-vectorial plane wave expansion method for calculating PBG structures. This method is based on casting Maxwell's equations in a periodic structure as an eigenvalue problem with the electromagnetic field expanded in a basis of plane waves.

FIGS. 3A-3H show the results of modeling performed on BGG PBG fiber with triangular air hole pattern and air fills of 50 to 95% in 5% increments. For the germanate glass modeled in this example, which has an index of refraction of 1.7 (many examples of such glasses have indices of refraction in the range $1.6<n<1.8$) for visible to mid-infrared region, there exists a large first-order gap above 80% fill as well as some narrow gaps below 80% fill. Larger gaps appear at approximately 90-95% fill. Each of the graphs in FIG. 3 depicts the location of band gaps, which are shaded with vertical black bars 310, as a function of frequency on the y-axis and the effective index of refraction of the mode in the fiber $\beta_p$ on the x-axis. The 45° solid black line 300 in each graph of FIG. 3 corresponds to an index of refraction of n=1. Similarly, the solid black line 300 corresponds to the locus of points where the quantity $k_0a$ (i.e. the wavenumber of the light times the diameter of the air spaces in the structured region) is equal to the effective index of refraction of the mode. The wavefront can propagate where the quantity $k_0a$ is on the line 300. Thus, where the line 300 overlaps the bars 310, corresponds to light propagating through the fiber and restricted to the hollow core by a photonic band gap.

It can be difficult to make high air fraction preforms, especially from specialty glasses such as germanate glasses. Unlike silica, which is a relatively strong material, specialty glasses may be weaker and become difficult to fabricate, and moreover, difficult to handle when the air fraction is so high. Consequently, certain fabrication techniques are especially suitable for making high air fraction fiber from specialty glasses.

In the first manufacturing step in a method of some embodiments, a preform comprising a germanate glass is provided. The preform is cylindrical. As used herein, the term "cylindrical" is not limited to round structures, but also refers to preforms having substantially the same perpendicular outside cross-section along the entire length of the preform, or along the length of the preform that is to he drawn into a fiber. The preform may include head or tail portions that do not have the same cross-section, or any other stated characteristic, that is otherwise stated to run the length of the preform, as long as the characteristic is present in the portion of the preform that is to be drawn into a desired fiber. Example cylinders include, but are not limited to, a normal round cylinder and a hexagonal cylinder, with smooth sides or with sides made of half circles.

The preform has a longitudinal central opening or hole that runs the length of the preform, which is hollow. The central opening may or may not he centered in the preform. Surrounding the central opening and running the length of the preform is a microstructured region comprising a plurality of hollow, longitudinal central openings. The microstructured region may or may not be radially symmetrical. Certain surrounding openings are adjacent to the central opening in that they are in a first layer of openings around the central opening. This layer is between the central opening and any non-adjacent surrounding openings: For example, when the microstructured region is a hexagonal arrangement of surrounding openings, the adjacent openings are those in the hexagon immediately surrounding the central opening.

The preform is constructed so that the central opening is larger in diameter than that of any of the adjacent surrounding openings. In some embodiments, all the surrounding openings are approximately the same size. For example, they may be made from the same kind of tubing, which inherently has a certain range in its size from point to point due to imperfect manufacturing, but is considered to he approximately the same size at all points. In some of these embodiments, the central opening has at least two times the diameter of the surrounding openings.

In some embodiments, the preform also comprises a jacket material comprising the non-silica-based glass. The jacket can help to protect the potentially fragile microstructured region of both the preform and the fiber and provide mechanical integrity.

Figure 4:
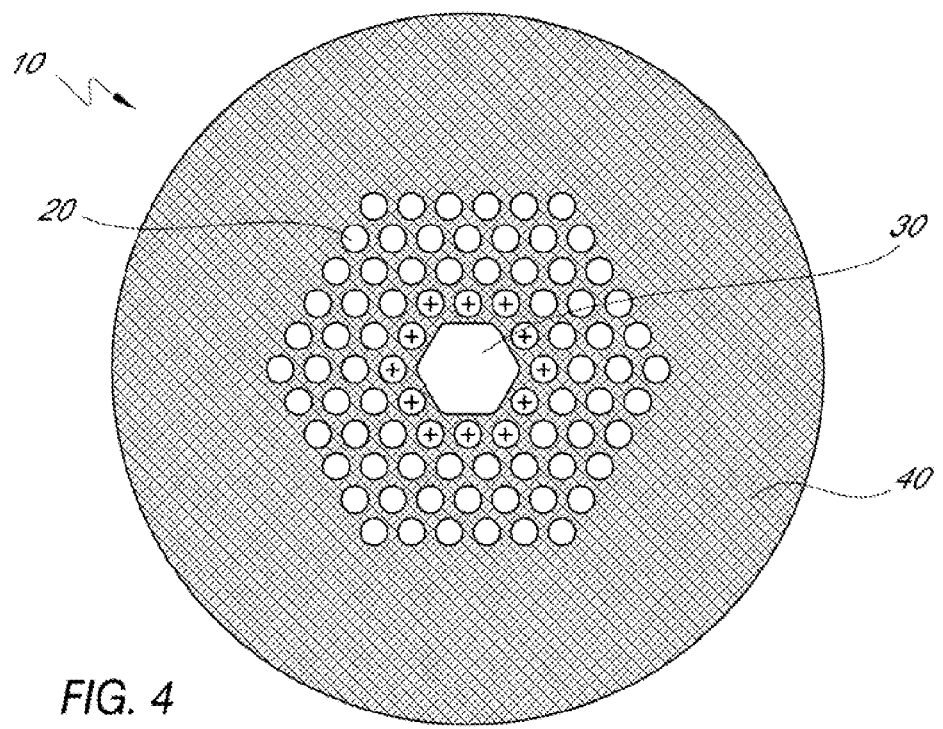
FIG. 4 shows a cross-section of a preform.
Figure 5:
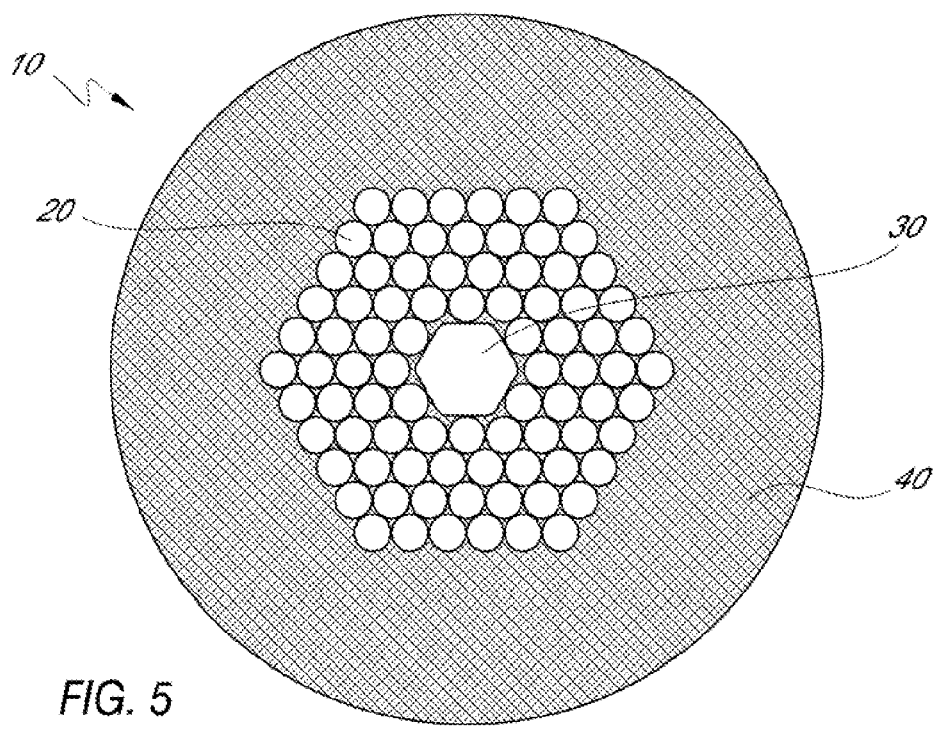
FIG. 5 shows the cross-section of a fiber that may he made from the preform of FIG. 4.

A cross-section of a suitable preform is shown in FIG. 4. The preform 10 can be made by stacking tubes 20 of the same size in a hexagonal structure, leaving seven tubes missing in the center to form the central opening 30. A larger tube may also be inserted into the central opening to define a round opening or an opening of another shape. The entire stack is placed inside a hollow jacket 40, and the entire assembly fused together. The fusing can substantially eliminate the interstitial voids between tubes with a circular outer diameter. Alternatively, tubes with a hexagonal outer diameter may he used so that there are no voids between the tubes. Adjacent openings are indicated by the "+" symbols. FIG. 5 shows the cross-section of a fiber that may be made from the preform of FIG. 4. The air faction of the preform may be much less than the air fraction of the final fiber. It is to be understood that fabrication of the PBG preforms using the tube stacking technique is only one example of fabricating these microstructured preforms. Other techniques could be used to fabricate the PBG preforms.

In the second step, the central opening and surrounding openings are pressurized with a gas. This can be done with a gas supply assembly attached to one end of the preform and the other end of the preform positioned above a fiber draw furnace. The gas can be the same or different gases in different openings. Suitable gases include, but are not limited to, inert gases, nitrogen, argon, and helium. An inert gas can be used to maintain a passive environment during processing. Alternatively, a reactive gas can be used to purify the surface of the openings or modify the composition on the inside surface of the openings, thereby adjusting properties such as refractive index, and/or the physical and thermal properties. The gas pressure in the central opening may be controlled independently from and may be less than the gas pressure in the surrounding openings. Consequently, the ratio of the respective hole diameters can be modified in a controlled manner.

In the third step, the preform is drawn into a fiber. Note that the steps of pressuring and drawing occur concurrently, with the possibility that either step can begin first. The drawing is done at an elevated temperature so that the glass is softened. The gas pressure maintains and prevents the collapse of the central opening and the surrounding openings of the microstructured region. The gas pressure can be controlled at a substantially constant pressure during the drawing step, so that the resulting fiber has substantially the same cross-section along its length.

The whole fiber drawing furnace can be located inside an inert atmosphere if drawing specialty glasses where atmospheric control is important. Furthermore, the fiber drawing assembly can be isolated from environmental contaminants such as dust and other extraneous particles, which might have a detrimental impact on fiber strength and/or optical properties. The preform can be lowered into the furnace at a known rate while the temperature is gradually increased from a predetermined temperature to prevent thermal shock of the preform. Once the temperature is sufficiently high, for example corresponding to a glass viscosity in the range of about $10^4$ to $10^6$ Poises, the preform will soften and be drawn into fiber with considerably smaller dimensions than the starting preform.

Figure 6:
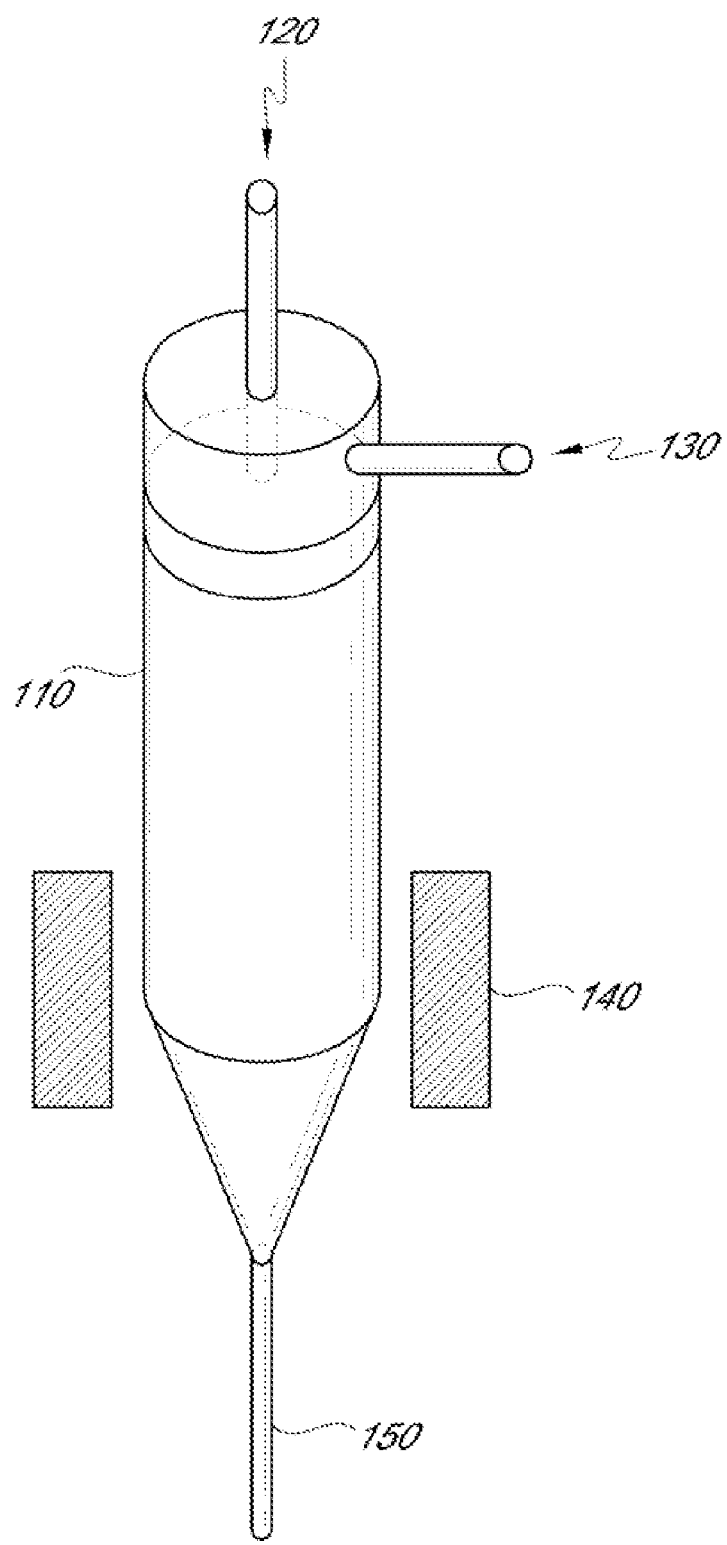
FIG. 6 schematically illustrates an apparatus for drawing a fiber.

FIG. 6 schematically illustrates a pressurizing and drawing apparatus. The preform 110 has gas pressure 120 flowing directly into the central opening, and another source of gas pressure 130 over the microstructured region. The gas pressure 120 may flow through a tube inserted into the central opening, without any need to enlarge the openings. The preform 110 is lowered into a fiber draw furnace 140, from which it emerges as a fiber 150.

The gas pressure or pressures are chosen so that the air fill fraction of the microstructured region is different in the fiber from what it is in the preform, as opposed to merely maintaining the same air fill fraction and preventing collapse of the openings. The air fill fraction can be increased by the drawing step and may be raised up to or more than 90% depending on the air fill fraction of the preform. It is also possible to apply pressure to the preform before the fiber drawing to modify the size of the holes in the preform. The required air pressure to change the air fill fraction or even just to prevent collapse of the holes can be different than it would be if the glass were silica, as the surface tension and viscosity of the non-silica glasses can he different.

The resulting fiber has a structure similar to the preform, with a central opening, a microstructured region, and a jacket. The microstructured region can have an air fill fraction of greater than approximately 90%, approximately 90%-approximately 95%, 95%, or greater than 95%. The diameter of the fiber may be, but is not limited to, in a range of 80-1000 µm. For example, the diameter of the microstructured preform could be greater than 10 mm whereas the fiber diameter could be less than 200 µm.

The structure of the fiber can cause it to have the properties of a photonic bandgap fiber. Light of a wavelength in the band gap can propagate through the fiber, while being confined to the central opening. The microstructured region can prevent all or most of the light from passing through the glass, including any layer of glass that may be between the central opening and the adjacent surrounding openings. The photonic band gap may be centered at a wavelength that is in the infrared and may be significantly longer than 2 microns.

The exact air fraction and periodicity in the final fiber will be controlled by the temperature, viscosity of the glass, fiber draw rate, and gas pressure. This assumes that the feed rate of the preform into the hot zone is fixed at a predetermined rate, which is typical in fiber drawing. It is possible to modify and control the air fraction and periodicity along with the overall fiber diameter, thereby controlling the photonic hand gap. Another consequence at high air fraction is that the holes may no longer be round, but instead more hexagonal. This does not necessarily have a detrimental impact on the PBG properties.

Example uses of the fiber include, but are not limited to, facility clean up, biomedical analysis (e.g. glucose, blood, breath), Chemical and Biological Warfare (CBW) agent detection, toxic and hazardous chemical detection, and environmental pollution monitoring and process control. In addition to chemical sensing, the PBG fibers can be used for very high laser power delivery since the light is predominantly guided in the hollow core, unlike in traditional fibers, which possess a solid core that can he damaged at high powers. This may have a positive and enabling impact in next generation high power infrared missile warning systems. Further benefits of PBG fibers include reducing system complexity, weight and cost as well as enabling remoting of high power lasers for cutting, welding, and metrology, as well as laser surgery, cancer removal and glaucoma treatment.

One of ordinary skill in the art will understand that the invention may be embodied in a variety of different manners and is not limited to the specific embodiments described above.

What is claimed is:

1. A glass fiber, comprising:
    a fiber comprising at least 30 mol % of a germanium oxide;
    a longitudinal central opening in the fiber;
    a microstructured region in the fiber comprising a plurality of longitudinal openings disposed around the central opening;
    a jacket surrounding the microstructured region;
    wherein the air fill fraction of the microstructured region is at least about 90%.

2. The fiber of claim 1, wherein the fiber displays a photonic band gap inhibiting radial transmission of visible and/or infrared light.

3. The fiber of claim 1, wherein the photonic band gap prevents radial transmission of 0.4 µm to 6 µm light.

4. The fiber of claim 1, wherein air fill fraction of the microstructured region is about 90%-95%.

5. The fiber of claim 1, wherein air fill fraction of the microstructured region is at least about 95%.

6. The fiber of claim 1, wherein the fiber has an index of refraction of about 1.6 to about 1.8.

7. The fiber of claim 1, wherein the fiber has an index of refraction of about 1.7.

8. The fiber of claim 1, wherein the fiber has a diameter of about 80 microns to about 1000 microns.

9. The fiber of claim 1, wherein the fiber comprises a barium oxide.

10. The fiber of claim 1, wherein the fiber comprises a lead oxide.

11. The fiber of claim 1, wherein the fiber comprises a gallium oxide.

12. A glass fiber, comprising:
    a fiber comprising at least 30 mol % of a germanium oxide;
    a longitudinal central opening in the fiber;
    a microstructured region in the fiber comprising a plurality of longitudinal openings disposed around the central opening;
    a jacket surrounding the microstructured region;
    wherein the air fill fraction of the microstructured region is at least about 90%; and
    wherein the fiber displays a photonic band gap inhibiting radial transmission of light having a wavelength in the range of approximately 2 µm and approximately 6 µm.

13. A method of making a fiber comprising the steps of:
    providing a glass preform comprising at least 30 mol % of a germanium oxide,
    wherein the glass preform comprises a longitudinal central opening and a microstructured region comprising a plurality of longitudinal openings disposed around the central opening; and
    pressurizing longitudinal openings with a gas; and
    drawing the glass preform into a fiber at an elevated temperature while maintaining the gas pressure to retain the longitudinal central opening and the microstructured region;
    wherein the air fill fraction of the microstructured region of the fiber is greater than approximately 90%.

14. The method of claim 13, wherein the diameter of the central opening is larger than the diameter of any longitudinal opening that is adjacent to the central opening.

15. The method of claim 13, wherein the gas pressure in the central opening is less than the gas pressure in the longitudinal openings.

16. The method of claim 13, wherein the gas pressure is maintained at a pressure that results in a fiber having an air fill fraction of the microstructured region of about 90%-95%.

17. The method of claim 13, wherein the diameter of the fiber is from about 80 microns to about 1000 microns.

18. The method of claim 13, wherein the glass perform comprising the at least 30 mol % of a germanium oxide has a $T_g$ of less than approximately 500°.

* * * * *